United States Patent Office 3,419,587
Patented Dec. 31, 1968

3,419,587
ZIRCONIUM COMPOUNDS
Samuel Edward Harson, Culcheth, near Warrington, England, assignor to Hardman & Holden Limited, Manchester, England, a British company
No Drawing. Filed May 17, 1965, Ser. No. 456,526
Claims priority, application Great Britain, May 20, 1964, 20,741/64
7 Claims. (Cl. 260—414)

ABSTRACT OF THE DISCLOSURE

Metal-organic compounds containing zirconium and one or more divalent metals are prepared by first reacting zirconyl carbonate with a monocarboxylic acid and then reacting with one or more divalent metals in powder form or in the form of oxides, hydroxides or carbonates and distilling to remove the water which is liberated. An alkyl phosphoric or phosphorous acid or a sulphonic acid may be added in addition to the carboxylic acid.

This invention relates to new divalent or polyvalent metal zirconato compounds and related complexes designed for good compatibility with organic media and having utility as driers for surface coatings, components of surface coating media, coating compositions, stabilisers for PVC and lubricant and polymer additives and adhesives.

The products of the invention will be described by reference to a series of empirical formulae with some indication of probable structure where this can reasonably be deduced.

One object of the present invention is to provide new compounds and complexes of divalent metals, zirconium and carboxylic acids with or without phenols or oxygenated organics, formulated to give good solubility in organic media. Another object of the invention is to provide efficient economical processes of manufacture together with the economic use of raw materials. Thus, for example, efficient low viscosity drier solutions containing 6% cobalt and 9.1% zirconium can be prepared with the empirical compositions $CoZrPr_2V$ or $CoZrV_2$. In the description the following abbreviations have been used:

$HPr$ = propionic acid
$HT$ = tall oil fatty acids
$HV$ = Versatic acid, which is a proprietary product comprising tertiary carboxylic acids which are fully saturated and highly branched and have 9–11 carbon atoms
$HM$ = methacrylic acid
$X$ = a monocarboxylic acid radical
$Y$ = a second monocarboxylic acid radical
$HN$ = naphthenic acid
ICI 810 = a mixture of branched chain, saturated, aliphatic monocarboxylic acids having 8 to 10 carbon atoms per molecule.

The compounds and complexes and compositions of matter can be represented by the following general formulae:

(1) $\qquad D.Zr(OH)_nX_m$ where $D$ = divalent metal
$X$ = carboxylic acid or mixture of carboxylic acids with or without phenolic compounds
$m$ = 2–4
$n$ = may be variable but probably not greater than 3.

(2) $\qquad D_2Zr(OH)_nX_m$ with definitions as above and $m$ = 4–6

(3) $\qquad D^1D^2Zr(OH)_nX_m$ with $m$ = 4–6
and $D^1$ and $D^2$ represent different divalent metals (4) $\qquad$ Mixtures of 1–3

(5) $\qquad D_nZrX_m$ in which $m$ is a quantity not exceeding 2 and $n$ is a quantity less than 1.0.

In addition it is often found to be advantageous to include a proportion of polar oxygenated organic compound capable of coordinating with zirconium to facilitate processing and to improve stability and compatibility. A convenient commercially available compound is isobutyl alcohol which can be used as an azeotroping solvent in the removal of water but a variety of other compounds can be substituted. According to the invention a high proportion of low molecular weight carboxylic acid can be used, i.e., $CoZrPr_2V$ above. This can facilitate the preparation of compounds with high metal content and at reduced cost. However, in addition it is possible to prepare new compounds, with improved technical properties. Specifically, efficient new paint driers not previously available to the industry can be made as illustrated for example, by Examples 1, 2, 3, 15, 20. It is thought that complexes of this type can most reasonably be represented by the formulae:

(6) 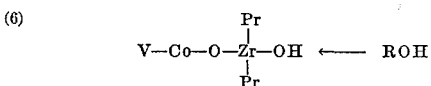

(7) 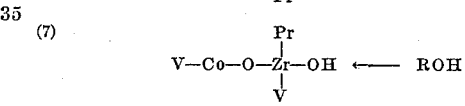

(8) 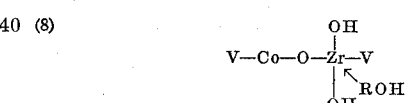

(9) 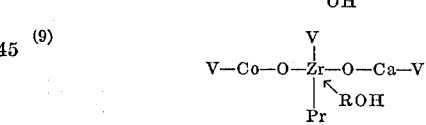

These permit evaluation of drier structural factors not previously possible.

The invention also includes partially condensed compounds based on the zirconium tetramer structure

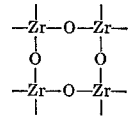

and of the general formula $$D_mO_nZr_pX_q(OH)_rZ_s$$

where $m$ = 1–8 and $D$ = divalent metal or metals
$n$ = a number not greater than 12
$p$ = 4
$q$ = 4–12 where X is carboxylic acid
$r$ = a number not greater than 4
$s$ = 1–8 or more where Z is an oxygen containing coordinating agent or agents expressed as monodentate.

There may in addition in some cases be recoverable water or water of coordination generally not greatly exceeding one mol per zirconium atom. Zr—O—Zr bonds may be present but in excess may be technically undesirable, and while in most cases ROH appears to be coordinated to zirconium the presence of Zr—OR bonds is not excluded.

The divalent metals or mixtures covered by the invention include magnesium, calcium, strontium, barium, zinc, cobalt, cadmium, mercury, copper, iron, lead, manganese and nickel. In addition there may be present a small amount of sodium, potassium or ammonium base.

A convenient method of manufacture can be based on commercially available zirconyl carbonate but other suitable reactive forms of freshly precipitated or basic inorganic zirconium compounds may be used. In practice good reaction rates are obtained with water wet cake or damp crumb (paste) which may also contain residues of sodium or ammonium radicals. No particular processing difficulty has been experienced with basic residues up to about 0.2 mol (as sodium) per zirconium, though in some cases slight adjustment of formulation may be made to take account of this factor.

With regard to carboxylic acids it can be seen from the examples that high metal contents can be rendered organically soluble with as little as one $C_8$–$C_{11}$ carboxylic acid per D.Zr combination and lower carbon ratios are not excluded provided adjustment is made in the nature of the solvent when necessary. In general, increase in the carboxylic carbon to D.Zr ratio gives improved solubility in non-polar diluents through this is of course also affected by the increase in the value of $m$ towards 4 or 6 in the general Formulae 1–4 above. With carboxylic acids smaller than propionic or more polar, processing generally is facilitated by adjustment of the nonpolar to polar constituents to the processing diluents or, if necessary, by ageing of intermediates. Carboxylic acids of the solubilising type referred to ($C_8$–$C_{30}$) include natural fatty acids, synthetic straight or branched chain acids including versatic acid 911 and I.C.I. $C_8C_9C_{10}$ branched chain acids 810, petroleum derived carboxylic acids such as naphthenic acid, other acids, aromatic or substituted aromatics or halogenated carboxylic acids or unsaturated acids. However, in a preparation of the type $PbCoZrX_{4-5}$, for example, the same solubilizing $C_8$–$C_{11}$ synthetic acids would not necessarily be chosen for lead and cobalt respectively. With regard to phenols, alkyl substitution up to $C_8$ or more may be used and a proportion of halogenated phenol may also be incorporated for specific applications. Dicarboxylic acids may also be incorporated if desired, with appropriate choice of reaction procedure and composition. It is difficult to generalise with regard to the divalent metals since differences in behaviour can be detected between close neighbours such as zinc and cadmium and calcium and barium. With regard to both calcium and barium, however, it can readily be demonstrated that the zirconium complexes have the practical advantage of easy processing and lack of heat sensitivity. This is, however, also enhanced by selection of appropriate $m$ ratio in the Formulae 1–4.

As will have been apparent from the foregoing, processing may be aided by the inclusion of a proportion of diluent or solvent and removal of water can conveniently be carried out in Dean & Stark type equipment. The products may be partially or fully dehydrated. The process may be continued if necessary with removal of volatile diluent and substitution of volatile or nonvolatile diluents or coordinating agents. These include glycols and polyglycols and their partial ethers, esters such as triglycerides which may be saturated or unsaturated, phosphate esters, synthetic esters such as dioctyl phthalate, Cerechlors or Arochlors, hydrocarbon lubricating oils or waxes depending on the application envisaged.

If desired for use as a surface coating or coating composition selected products may be combined in any proportion with alkyd resin solutions or other suitable varnishes.

The divalent metals can be used conveniently in the form of the metal powder, metal oxide, hydroxide or carbonate. In the use of metal powders care may be necessary to give controlled rate of hydrogen evolution.

In addition to carboxylic acids, a proportion of alkyl or aryl phosphoric acids, or alkyl or aryl phosphorous acids or sulphonic acids including the range of $C_8$–$C_{30}$ sulphonic acids may be incorporated.

The final products may be further compounded if desired with organic compounds containing nitrogen, phosphorus or sulphur and capable of coordinating with zirconium.

With regard to processing, convenient procedures may be represented by empirical general equations, e.g., (1) Basic zirconium $+2HX \rightarrow ZrX_2$
(2) $ZrX_2+D(OH)_2 \rightarrow ZrX_2$
(3) $ZrX_2+HY+DO \rightarrow D.ZrX_2Y$
(4) $ZrX_2+HX+HY+2D(OH)_2 \rightarrow D_2ZrX_3Y$
(5) $ZrX_2+HX+HY+D^1(OH)_2$
$+D^2(OH)_2 \rightarrow D^1D^2ZrX_3Y$ For some products of this type partial or fairly complete intermediate drying may be carried out before proceeding with the final stage. The same procedure may be preferred for other products using particular combinations of carboxylic acids or metals.

(6) $ZrX_2+HY+D \rightarrow D.ZrX_2Y+$hydrogen

Processing is assisted by adequate stirring and vacuum may be used at certain stages. Volatile coordinating agents or stabilisers may be replaced in the final product by non-volatile stabilising agents. The latter may include higher glycols or polyglycols or their half ethers or esters. In some cases, according to the conditions of processing, volatile coordinating agents used during processing can not easily be removed from the final product.

As can be seen from the examples it is possible to react the $ZrX_2$ stage with divalent metal to give $D.ZrX_2$. However, when a high proportion of small acid is used in a composition of the type $D.ZrX_3$ type it is frequently preferred to add the third acid to the system before reaction with the divalent metal.

The processes and products are some fully illustrated by the following examples.

Example 1.—6% cobalt 9.1% zirconium solution:
$CoZrPr_{2.15}V_{1.0}$ 306.5 gm. of water wetted commercial zirconyl carbonate paste 1 mol was weighed into a three-necked reaction flask and an addition made of 86 gm. of isobutyl alcohol. To the wet crumb an addition was made of 159 gm. of propionic acid, about 40% being added before starting the stirrer. The product was stirred at room temperature for 2 hours yielding a moderately opaque medium viscosity emulsion. Heat was applied and the temperature raised to 96° C. under reflux in 1 hour, resulting in a reduction in the opacity of the emulsion.

The product was cooled overnight, then stirred at room temperature and an addition of 96 gm. of commercial cobalt hydrate made at room temperature. Immediate thickening occurred with formation of a reddish emulsion and an addition was started of 181 gm. (1 mol) of versatic acid. Reaction continued with formation of solid which stopped the stirrer. However, stirring was resumed after addition of 25% of the versatic acid and on completion of addition an oily liquid containing a tough solid was obtained. The product was heated and dispersion of solid observed from 80° C. An addition of white spirit 86 gm. was made and the product held at 85–92° C. for 4½ hours under reflux by which time most of the solid had dispersed.

The flask was changed to a Dean & Stark fitting and the product dried to a product temperature of 134° C. in 6½ hours, when 206 cc. of aqueous distillate was obtained. The product was made up to 980 gm. with white spirit.

Part of the product was filtered through filter cloth and was found to filter rapidly, leaving negligible residue, giving a low viscosity clear purple solution having good compatibility and clarity in alkyd media, and useful as a drier for paint.

The remainder of the product was processed further with the following results:

Stripping of IBA to a vessel temperature of 155° C. with low vacuum also yielded 2½ cc. of water. After 24 hours the resultant solution was a purple moderately hazy oily liquid.

Further drying in Dean & Stark apparatus to a flask temperature of 177° C. yielded 3.9 cc. additional water. Some deposition occurred on the walls and the bulk of the product was a blue moderately hazy oily liquid.

Modification of the above solution with 7% IBA resulted in the deposition of 30% sediment.

Variation of procedure in the early stages can be used to avoid undesirable solidification.

Example 2.—6% cobalt 9.1% zirconium solution:
$CoZrPr_{1.2}V_{2.0}$ 289.5 gm. of water wetted zirconyl carbonate paste (1 mol) was weighed into a three-necked reaction flask and an addition made of 86 gm. of isobutyl alcohol and 86 gm. of white spirit. To the stirred slurry an addition was made at room temperature of a mixture of propionic acid 88.8 gm. (1.2 mol) and versatic acid 181 gm. (1 mol). The mixture was heated to 60° C. when a fairly transparent emulsion was obtained. A further mol of versatic acid was added and the emulsion allowed to stand overnight. At room temperature an addition of 96 gm. cobalt hydrate was made with formation of a red slurry and exotherm to 26° C. Heating gave a transparent purple product at 60° C. in 75 minutes and the product was held under reflux for a further 1½ hours while heating to 96° C.

The apparatus was changed to Dean & Stark and the product dried to a vessel temperature of 140° C., when 200 cc. of aqueous distillate was obtained together with 774 gm. of cobalt zirconium derivative. An addition was made of 157 gm. white spirit and the solution modified as following to give solutions containing 6% cobalt, 9.1% zirconium.

To the first part an addition was made of 5% white spirit. It filtered rapidly to give a clear blue purple solution leaving negligible residue on the filter.

To the second part an addition was made of 5% dipropylene glycol and was found to filter easily giving a clear reddish blue solution with negligible residue on the filter.

To the third part an addition was made of 5% of the monoethyl ether of diethylene glycol. The solution filtered easily giving a clear purple solution with a trace of brown sediment on the filter.

By a similar procedure 1 mol of Zirconyl Carbonate paste, 43 gm. methyl isobutyl carbinol, 68 gm. of dipropylene glycol were reacted with 1.7 mols of propionic acid and 1.5 mols of versatic acid and one mol of cobalt hydrate.

The product was dried to 145° C. yielding a clear blue purple solution. Part was dried to 174° C. yielding a clear royal blue solution. The solutions had particularly good compatibility with drying oils and alkyds and oleoresinous media.

The solutions were tested as driers for paint.

Example 3.—6% cobalt, 9.1% zirconium:
$CoZrX_{2-1/6}$ 289.5 gm. of water wetted zirconyl carbonate paste containing ⅙ mol of sodium per zirconium was weighed out in a three-necked 2-litre reaction flask and an addition was made of 86 gm. of isobutyl alcohol and 86 gm. of white spirit. To the stirred slurry an addition was made of 392 gm. (2⅙ mols) of versatic acid. The product was heated and 40 cc. of water was removed by Dean & Stark distillation and allowed to stand over a week-end. The stirrable emulsion was further dried by Dean & Stark distillation until 120 cc. of aqueous distillate had been removed. An addition was made of 100 gm. of white spirit which rendered the emulsion more opaque and an addition was then made at 60° C. of 96 gm. (1 mol) of cobalt hydrate. After 10 minutes a purple medium viscosity product was formed at 60° C. It was heated under reflux at 95° C., when a dull hazy purple solution was obtained with a slight ring of unreacted cobalt hydrate at the product air interface.

The product was dried by Dean & Stark distillation until a total of 180 cc. aqueous distillate was obtained together with 846 gm. of crude cobalt zirconium solution. An addition was made of 85 gm. of white spirit and the product modified (a) with 5% white spirit, (b) 5% monoethyl ether of ethylene glycol, (c) 5% monoethyl ether of diethylene glycol and filtered.

A small amount of insoluble residue was obtained on filtration and a conversion of 98–99% of the cobalt hydrate was estimated.

The filtered solutions were tested as driers and found to have good compatibility with drying oils and alkyd media.

Substitution of acetic acid for propionic acid in the processes of Examples 1–3 generally results in the formation of heterogeneous products.

Example 4.—Cadmium zirconium versatate propionate: $CdZrPr_{1.2}V_{2.0}$ 289.5 gm. of water wetted zirconyl carbonate paste was weighed into a three-necked reaction flask followed by 86 gm. of isobutyl alcohol and 86 gm. of white spirit. While stirring at room temperature an addition was made of a mixture of propionic acid 88.8 gm. (1.2 mols) and versatic acid 181 gm. (1 mol). Heating under reflux gave a slightly lumpy emulsion which thinned to a transparent emulsion at 62° C., when a further 181 gm. of versatic acid was added, followed by 128.4 gm. (1 mol) of cadmium oxide. After heating to 95° C. under reflux for 40 minutes only a small amount of unreacted cadmium oxide remained and the product was allowed to stand overnight. Heating for a further hour under reflux resulted in complete solution of the cadmium oxide.

The product was dried by Dean & Stark procedure to a product temperature of 133° C., when 170 cc. of aqueous distillate was obtained together with a product yield of 841 gm. The product which was a low viscosity almost clear solution was filtered without further dilution giving a fairly viscous solution when cold.

It was adjusted by addition of white spirit to give an oily clear solution containing 12% cadmium and 9.7% zirconium.

On testing as a stabiliser for PVC the product had good compatibility and gave good results on comparison with commercially available stabilisers.

By a similar procedure 1.2 mols of methacrylic acid were substituted for the 1.2 mols of propionic. The final filtered product had a hazy colloidal appearance but was found to give good clarity on testing as a PVC stabiliser.

Example 5.—Cadmium zirconium propionate tallate $CdZrPr_{1.5}T_{1.7}$ 289.5 gm. (1 mol) of zirconyl carbonate paste, 86 gm. of isobutyl alcohol and 86 gm. of white spirit were weighed into a three-necked reaction flask and an addition made while stirring at room temperature of 111 gm. (1.5 mol) of propionic acid followed by 203 gm. (0.7 mol) of tall oil fatty acids. This procedure minimises frothing due to $CO_2$ release.

The mixture was heated and became transparent at 60° C. when a further 290 gm. (1 mol) of tall oil fatty acid was added, followed by 128.4 gm. (1 mol) of cadmium oxide. Some initial granular aggregates of cadmium oxide dissolved on heating at 100° C. for about 40 minutes under reflux.

The product was dried by Dean & Stark procedure with the recovery of 171 cc. of aqueous distillate at a vessel temperature of 132° C. White spirit 141 gm. was added to give a viscous clear light brown solution containing 10% cadmium and 8.1% zirconium.

A repeat product substituting methacrylic acid for propionic acid gave a clear tough plastic solid final product containing 10% cadmium and 8.1% zirconium.

Example 6.—Barium zirconium propionate versatate: $BaZrPr_{1.7}V_{1.5}$ 289.5 gm. (1 mol) of zirconyl carbonate paste, 86 gm. of isobutyl alcohol and 86 gm. of white spirit were weighed into a three-necked reaction flask and an addition made while stirring at room temperature of 126 gm. (1.7 mol) propionic acid and 90.5 gm. (0.5 mol) of versatic acid. The emulsion thickened at about 35° C., thinned at 40° C. and became transparent at 59° C. At 65° C. an addition was made of 181 gm. (1 mol) versatic acid followed by 261.4 gm. (1 mol) of barium hydroxide pentahydrate flake. Heating to 80° C. gave a hazy opaque medium viscosity emulsion with suspended granules of barium hydroxide. Continued heating under reflux at 96° C. for 2½ hours left no significant visible unreacted barium hydroxide. Drying by Dean & Stark for 2 hours at 96° C. gave 102 cc. of aqueous distillate after which the product was cooled overnight. In the morning some sticky solid was found on the stirrer and on the flask walls below a superficial oily layer. The product was heated cautiously until dispersal of the solid was obtained and drying by Dean & Stark procedure was then continued. After drying to 100° C., aqueous distillate 243 cc., the product was fairly viscous. An addition of 49 gm. of the monoethyl ether of diethylene glycol was made and the product cooled overnight. In the morning the product consisted of a fairly viscous, fairly clear top layer with a heavy (½ inch) deposit sticky white solid which was again heated cautiously until dispersion was obtained. Dean & Stark drying was then continued to a vessel temperature of 126° C. when 279 cc. of aqueous distillate was obtained together with 856 gm. of barium zirconium product. The product was made up to 980 gm. by the addition of 124 gm. of white spirit to give a homogeneous hazy colloidal moderately viscous solution on cooling, containing 14% barium and 9.3% zirconium.

On further dilution testing it was observed that the product diluted much more rapidly with a mixture of white spirit/ROH than with white spirit alone.

Example 7.—Calcium zirconium propionate tallate: $CaZrPr_{1.2}T_{2.0}$ 289.5 gm. (1 mol) of zirconyl carbonate paste, 86 gm. of isobutyl alcohol and 150 gm. of white spirit were weighed out in a three-necked reaction flask. While stirring at room temperature an addition was made of 89 gm. (1.2 mol) of propionic acid followed by 290 gm. (1 mol) of tall oil fatty acid. A transparent yellow emulsion was obtained on heating to 60° C. when a further addition of 290 gm. (1 mol) of tall oil fatty acid was made, followed by the addition of 75 gm. of commercial slaked lime $Ca(OH)_2$. A lumpy dispersion of lime was obtained. Heating to 97° C. in 2 hours gave a very viscous product which thinned considerably 20 minutes later at 100° C. but which still contained some lumpy gel particles dispersed in a liquid medium after a further 2 hours reflux. After standing overnight the product solidified to a stiff buttery consistency.

Drying by Dean & Stark for 3 hours gave 100 cc. of aqueous distillate with a very viscous moderately opaque product. An addition of 73 gm. of white spirit had little effect on viscosity. Dean & Stark drying was continued until 170 cc. of aqueous distillate was obtained. The product was then in the form of a viscous liquid with large lumps of solid gel at a product temperature of 113° C. An addition was made of 100 gm. of isobutyl alcohol resulting in a clearer lower viscosity solution with reduced amount of gel.

Further processing showed that the product was heat sensitive at 115° C. with formation of solid gel on the walls and in bulk.

The final homogenised product was a viscous hazy solution incapable of filtration by normal practical standards.

A repeat of the above preparation substituting tall oil fatty acid for propionic acid ($CaZrT_{3.2}$) and with 100 gm. isobutyl alcohol 150 gm. of white spirit initially processed much more easily due to reduced heat sensitivity. It was dried to a final vessel temperature of 145° C. Filtration, however, would be classed as difficult. The final product at 60% solids concentration in white spirit diluent was in the form of a moderately viscous oily liquid.

Example 8.—Calcium zirconium methacrylate tallate: $CaZrM_{0.7}T_{3.0}$ 143.5 gm. (½ mol) of zirconyl carbonate paste, 45 gm. of isobutyl alcohol and 75 gm. of white spirit were weighed into a three-necked reaction flask. A mixture of 30.2 gm. of redistilled uninhibited methacrylic acid and 435 gm. of tall oil fatty acid was added over a period of 25 minutes while heating to 40° C. Moderate foam was observed at 45° C. and a clear yellow emulsion was obtained at 73° C.

The product was cooled to 45° C. and an addition made of 37.5 gm. of commercial slaked lime $Ca(OH)_2$. A lumpy dispersion of lime resulted but on further stirring to 30° C. without heating much of the lime had dissolved after 1 hour. The product was refluxed at 90° C. for 3 hours when the lime was completely dissolved. On standing overnight the product changed to a pasty consistency. It was remelted and an addition of 239 gm. of white spirit made yielding a low to medium viscosity liquid in which a few granules of lime could be seen.

Drying by Dean & Stark proceeded at a faster rate than in either of the preparations described in Example 7 and with no problems of heat sensitivity or heterogeneity, a total of 95 cc. of aqueous distillate being obtained at a product temperature of 141° C. The product was diluted to 60% solids by addition of white spirit and was found to filter much more easily than the corresponding $CaZrT_{3.2}$ product.

The three solutions of Example 7 and above were treated with 0.06% cobalt drier based on solids, and tested for film forming properties. All three gave clear touch dry films in about 1½ hours but no further ageing it was observed that the product of Example 8 containing methacrylic acid gave a considerably tougher film than the two products of Example 7.

Example 9.—Barium zirconium versatate propionate: $BaZrV_{3.0}Pr_{1.0}$ 287 gm. (1 mol) of zirconyl carbonate paste and 129 gm. of white spirit were weighed into a three-necked reaction flask and an addition made while stirring of a mixture of 74 gm. propionic acid (1 mol) and 181 gm. of versatic acid (1 mol). On heating the mixture thickened to a paste at 45° C. and then thinned to an emulsion at the same temperature. After standing over the week-end the emulsion was stirrable and fairly clear on reheating to 80° C. Heating was discontinued and an addition made of 363 gm. of versatic acid followed by the addition at 68° C. of 261.4 gm. of flake barium hydrate pentahydrate. After 10 minutes some flakes of barium hydroxide could be seen in the medium viscosity liquid. Heating was resumed and after 1 hour reflux some particles of barium hydroxide were still visible. Drying by Dean & Stark procedure gave 86 cc. of aqueous distillate with no apparent change in viscosity. After standing overnight the product was in the form of a clear liquid layer over a more viscous semitransparent liquid.

Dean & Stark drying was continued and a total of 280 cc. of aqueous distillate was removed in 6 hours at a final product temperature of 160° C. The final product was a clear brown soft solid containing 14% barium and 9.3% zirconium.

In comparison with the above preparation, a preparation of the simple $BaX_2$ soap based on a 3:1 versatic propionic ratio was made at a similar metal concentration (14% barium) in white spirit. In spite of the increased amount of diluent the product was found to be heat sensitive above 110° C., with solidification on the flask walls.

Example 10.—Zinc zirconium methacrylate tallate: $ZnZrM_{1.0}T_{2.0}$ 287 gm. (1 mol) of zirconyl carbonate paste, 90 gm. of isobutyl alcohol and 90 gm. of white spirit were weighed into a three-necked reaction flask and an addition made, while stirring, of a mixture of 86.1 gm. of methacrylic acid and 290 gm. of tall oil fatty acids, resulting in an opaque yellow emulsion. Heating to 72° C. yielded a considerably clearer emulsion and an addition was then made of 290 gm. of tall oil fatty acid followed by 81.4 gm. of zinc oxide. After five minutes at 75° C. some white zinc oxide was visible and the product was heated to 85° C. for a further half hour and allowed to stand overnight. The product was then in the form of a white waxy solid which was remelted and heated to 96° C. under reflux for 1 hour.

Drying by Dean & Stark procedure yielded 192 cc. of aqueous distillate in 6 hours at a final product temperature of 190° C. The final product was in the form of a moderately viscous light brown liquid on cooling to room temperature. On standing it changed to a soft semisolid low-melting semiopaque form.

Modification to the composition $ZnZrM_{1.0}T_{2.5}$ by addition of tall oil fatty acid in the ratio 0.5 HX per Zr gave a stiff pasty opaque solid.

Example 11.—Manganese zirconium propionate versatate: $MnZrPr_{1.5}V_{1.7}$ 287 gm. (1 mol) of zirconyl carbonate paste, 90 gm. of isobutyl alcohol and 90 gm. of white spirit were weighed into a three-necked reaction flask and an addition made while stirring at room temperature of 111 gm. (1.5 mol) of propionic acid and 127 gm. of versatic acid. The mixture was heated to 57° C. and allowed to stand overnight. A further addition to the emulsion was made at room temperature of 181 gm. of versatic acid. 55 gm. of manganese metal powder was added over a period of 2½ hours without external heating. Heat of reaction reached a maximum of 46° C. during this period. Stirring was continued without heating for 2 hours. The product was heated under reflux for 3 hours to 95° C. Analysis of the intermediate indicated substantial reaction of the manganese to oil soluble form.

Drying by Dean & Stark over 7 hours to a vessel temperature of 126° C. yielded 158 cc. of aqueous distillate.

The product which was in the form of a brown oily solution filtered easily and analysis of the filtrate showed 5.8% manganese, 9.1% zirconium.

Control of the rate of manganese addition is necessary to avoid uncontrollable reaction rate.

The product can be used as a through drier in surface coatings.

Example 12.—Barium zirconium propionate versatate octyl phenate: $BaZrPr_{1.0}V_{2.0}Oct.phenol_{1.0}$ 287 gm. (1 mol) of zirconyl carbonate paste and 93 gm. of white spirit were weighed into a three-necked reaction flask and an addition made of 74 gm. (1 mol) of propionic acid, followed by 181 gm. (1 mol) of versatic acid. The white suspension was stirred and a further addition of 181 gm. (1 mol) of versatic acid made. The mixture was heated to 68° C. and an addition made of 206 gm. (1 mol) of para-tertiary octylphenol followed at 78° C. by 261.4 gm. (1 mol) of barium hydroxide pentahydrate flake. Heating to 108° C. under reflux for three hours gave a moderately opaque medium viscosity liquid.

Drying by Dean & Stark procedure gave a reduction in viscosity after removal of 72 cc. of aqueous distillate and after removal of 168 cc. of water the product was allowed to stand overnight. The pasty solid was reheated and continued drying for 4 hours gave a total aqueous distillate of 281 cc. with a maximum product temperature of 175° C.

The final product at 14% barium, 9.3% zirconium concentration cooled to a translucent soft solid.

On reduction to 12% barium concentratoin by dilution with white spirit the product gave a slightly hazy moderately viscous oily liquid having good compatibility with PVC.

Example 13.—Cobalt zirconium acetate versatate: $Co/rAc_{1.0}V_{2.2}$ 6% cobalt, 9.1% zirconium 287 gm. (1 mol) of zirconyl carbonate paste, 164 gm. of isobutyl alcohol and 80 gm. of white spirit were weighed out in a three-necked reaction flask and to the stirred slurry an addition was made of a mixture of 60 gm. (1 mol) of glacial acetic acid and 218 gm. (1.2 mol) of versatic acid. The mixture was heated to 60° C. to clear and a further addition made of versatic acid 181 gm. (1 mol) fol'owed by 95 gm. (1 mol) of commercial cobalt hydrate. The product rapidly changed to a blue purple liquid.

Drying by Dean & Stark procedure for 5 hours to a vessel temperature of 120° C. gave 185 cc. of aqueous distillate together with a clear blue purple solution which filtered rapidly leaving negligible residue on the filter.

The resultant stable clear blue purple solution contained 6% cobalt and 9.1% zirconium.

Example 14.—Barium zirconium versatate propionate: $Ba_2ZrPr_2V_4$ 143.5 gm. (½ mol) of zirconyl carbonate paste, 53 gm. of isobutyl alcohol and 137 gm. of white spirit were weighed into a three-necked reaction flask and to the stirred slurry at room temperature the addition was made of a mixture of 74 gm. (1 mol) of propionic acid and 181 gm. (1 mol) of versatic acid. On heating from 31° C.–54° C. the emulsion was fairly clear and the addition was then made of a further 181 gm. of versatic acid, followed by 261.4 gm. (1 mol) of flake barium hydroxide pentahydrate. After 10 minutes, at 77° C., much of the barium had dissolved. The product was heated under reflux for 1½ hours yielding a low to medium viscosity liquid which was allowed to stand over a week-end. The resulting product was still stirrable at 17% barium content.

Drying by Dean & Stark procedure smoothly with removal of 215 cc. of aqueous distillate in 6 hours at a final product temperature of 139° C.

The product was reduced to 14% barium, 4.6% zirconium and cooled to a moderately hazy oil liquid of medium viscosity.

Example 15.—Calcium cobalt zirconinum versatate propionate: $CaCoZrV_{3.0}Pr_{1.0}$ 287 gm. (1 mol) of zirconyl carbonate paste, 90 gm. of isobutyl alcohol and 90 gm. of white spirit were weighed out in a three-necked reaction flask and an addition made while stirring at room temperature of a mixture of 74 gm. (1 mol) of propionic acid and 181 gm. (1 mol) of cersatic acid. Heating to 59° C. gaxe a semiopaque more viscous emulsion which reduced in visocsity and became fairly transparent at 68° C. An addition was made of 181 gm. (1 mol) of versatic acid followed by 96 gm. (1 mol) of commercial cobalt hydrate. After 5 minutes a dark blue purple product was obtained which was heated to 76° C. for 30 minutes. Heating was discontinued and an addition made of 181 gm. (1 mol) of versatic acid followed by 75 gm. (1 mol) of commercial calcium hydroxide. After 5 minutes a visually clear dark blue purple product was obtained, showing increased viscosity but easily stirrable. Stirring without heating was continued for 30 minutes and the product was then heated for 2 hours under reflux to 99° C. Drying by Dean & Stark procedure gave 150 cc. of aqueous distillate in three hours after which the product was allowed to stand over a week-end. The soft product was reheated and dried by Dean & Stark to a final product temperature of 146° C., when 202 cc. of aqueous distillate was obtained.

The product at 4% calcium 6% cobalt 9.1% zirconium content was visually clear dark blue purple and was found to solidify to a plastic solid on cooling. The product 1024 gm. was therefore diluted with white spirit 243 gm. to permit examination for filtration behavior and estimation of unreacted inorganic matter. Part of this solution diluted with 5% white spirit to give a metal content of 3% calcium 4.5% cobalt 6.8% zirconium filtered with difficulty but skinned hot on a vacuum filter and would be best handled in an enclosed pressure filtration system.

The remainder of the solution was diluted with 5% Cellosolve. The modified solution filtered more easily and had much less tendency to skin on exposure of the hot solution.

The solutions were found to have good compatibility with alkyd resin solutions. A small amount of a brown sediment estimated to be about 1 gm. was found, with cobalt as the main component. Conversion of the zirconium and calcium to organic soluble form was substantially complete while conversion of cobalt was estimated to be 98% minimum. No allowance was made in the formulation for the sodium content of the zirconyl carbonate paste which was approximately 0.15 mol of sodium per zirconium.

No evidence of heat sensitivity was observed during processing.

Example 16.—Cobalt zirconium propionate naphthenate: $CoZrPr_{2.2}N_{1.0}$ 289.5 gm. (1 mol) of zirconyl carbonate paste, 86 gm. of isobutyl alcohol and 86 gm. of white spirit were weighed into a three-necked reaction flask and an addition made, while stirring, of 163 gm. (2.2 mols) of propionic acid. The mixture was stirred at room temperature for 20 minutes and allowed to stand overnight when a fairly clear product was obtained. The emulsion was heated to 65° C. and an addition made of 245 gm. (1 mol) of naphthenic acid (Alchemy semirefined) followed at 47° C. by 96 gm. (1 mol) of commercial cobalt hydrate. After 5 minutes a dark purple medium viscosity solution was obtained which was heated under reflux to 95° C. for 2 hours.

Drying by Dean & Stark procedure gave 160 cc. of aqueous distillate in 3 hours after which the product cooled overnight to give a plastic solid. The product which was more viscous than a corresponding versatate derivative was still easily stirrable. On drying further to a product temperature of 121° C. aqueous distillate 190 cc. some lumpiness was observed in the purple oily liquid. An addition was made of 49 gm. of Dioxitol (mono-ethyl ether of diethylene glycol) with reduction of viscosity and dispersal of solid gel after 30 minutes. Final drying to a product temperature of 133° C. gave a total of 200 cc. of aqueous distillate. The product was diluted to 980 gm. by the addition of 191 gm. of white spirit to give a metal content of 6% cobalt 9.1% zirconium.

Part of the product filtered fairly rapidly but left an appreciable amount of gelatinous sludge on the cloth. The remaining unfiltered solution was reexamined after 3 months' storage and was in the form of a low viscosity purple oily liquid with a small amount of viscous sludge. A negligible amount of inorganic residue was found.

It could be expected that reduction of the proportion of propionic acid together with some modification of processing would give a more satisfactory product in respect of processing and general organic solubility.

Example 17.—Cobalt zirconium propionate versatate: $CoZrPr_2V_2$ 306.5 gm. (1 mol) of zirconyl carbonate paste and 250 gm. of white spirit were weighed into a three-necked reaction flask and a mixture of propionic acid 74 gm. and versatic acid 181 gm. (1 mol) was added at room temperature while stirring. Heating to 82° C. gave a transparent emulsion. At 68° C. an addition was made of 181 gm. (1 mol) of versatic acid followed at 50° C. by 96 gm. (1 mol) of commercial cobalt hydrate, followed by the addition of 73 gm. of propionic acid. In 5 minutes a dark purple solution was formed with an exotherm to 82° C.

Dean & Stark drying of the product yielded 206 cc. of aqueous distillate containing 9.6 gm. of propionic acid in 3½ hours to a product temperature of 156° C. Overnight the product cooled to a stirrable purple gel showing syneresis, yield 932 gm. The product was reheated and redried to 180° C. yielding 12.6 cc. of water containing 2 gm. of propionic acid. The hot solution was divided into a number of parts and modified, with the following results:

Part was modified with 5% white spirit to give metal contents of 6% cobalt 9.1% zirconium. Filtration through cloth using dicalite filter aid (0.5%) was slow and difficult. The product was decanted from the dicalite and stored for observation. The freshly prepared solution was a soft thixotropic gel. On storage for 3½ months it had changed to a stiff gel which broke down to an oily liquid on stirring and shearing.

Part was modfied with 5% dipropylene glycol giving an oily low viscosity solution and on filtration through cloth alone filtration slowed down. The clear reddish purple solution remained free from deposit after 3½ months' storage.

Part was modified with 5% dipropylene glycol giving moderately good filtration rates through cloth and dicalite. The blue purple solution remained completely clear and of low viscosity after 3½ months' storage.

Part was modified with 5% Cellosolve and gave good filtration rates through cloth and dicalite. The reddish purple solution remained completely clear and of low viscosity after 3½ months' storage.

Total insoluble matter from the molar batch was estimated to be about 4 gm.

The three ROH modified solutions had good compatibility with alkyds and with drying oils.

Example 18

A batch of cobalt zirconium propionate versatate (empirical formula $CoZrPr_{1.7}V_{1.5}$) was made by a procedure similar to that of Example 2, with one mol of isobutyl alcohol. The product was dried to a reaction temperature of 132° C. for ½ hour, filtered, clarified and adjusted to 6% cobalt 9.10% zirconium content by dilution with white spirit.

1200 gm. of the clear solution was placed in a three-necked flask with Dean & Stark and dried for two hours to a flask temperature of 166° C. during which time 23.5 cc. of aqueous layer equivalent to 1 mol of water per zirconium was recovered leaving a product yield of 1171.5 gm. 585.7 gm. of the dried product was weighed into a three-necked stirred reaction flask fitted with a Claissen Head and the product was distilled slowly at a product temperature of 180° C. A distillate of 2 cc. aqueous layer and 7 cc. of nonaqueous layer was obtained before the distillation temperature rose rapidly above 120° C. The product was allowed to cool and changed to a soft gel overnight which remained unchanged after 3 months' storage. It was then stirred, yielding a viscous liquid and aliquot parts were modified with the following additive in the ration 1 mol per mol of zirconium; (1) isobutyl alcohol, (2) Cellosolve, (3) dipropylene glycol, (4)

methyl carbitol. The modified products were obtained as low viscosity liquids with most rapid clarification from (2) and (3). Colours varied from red-purple to blue-purple. Analysis of the 7 cc. nonaqueous distillate above showed it to be mainly mineral spirits.

The remaining 585.7 gm. of dried product was transferred to a three-necked stirred reaction flask. Half the aqueous distillate removed initially was returned and the product heated under reflux for 40 minutes during which time the product reflux temperature fell to 131° C. and became constant. The flask was then fitted with Claissen Head and the product distilled slowly for 5 hours to a final product temperature of 181° C. An aqueous distillate of 11.0 cc. was obtained (11.75 cc. added) together with a nonaqueous distillate of 21 cc. Analysis of the nonaqueous distillate showed it to be mainly mineral spirit. After three months' storage the product was a hazy oily liquid, unchanged. As above, aliquot parts were modified with (1) isobutyl alcohol, (2) Cellosolve, (3) dipropylene glycol, (4) methyl carbitol in the proportion of 1 mol of additive per mol of zirconium. The modifications were obtained as low viscosity clear solutions with differences in rate of clarification and with colours varying from red to blue-purple.

The parent solution, dehydrated and modified solutions were tested for compatibility in two oil modified alkyd resin solutions, in alkali refined linseed oil and acid refined. Differences in ease and speed of compatibility were observed. The solutions were also tested for drying efficiency.

Example 19

A batch of cobalt zirconium propionate versatate in white spirit (empirical formula $CoZrPr_{1.2}Versatic_{2.0}$) was made by a procedure similar to that of Example 2 with one mol of residual isobutyl alcohol. The product was dried to a reaction temperature of 143° C., filtered, and clarified and adjusted to 6% cobalt content 9.1% zirconium content by dilution with white spirit.

1000 gm. of the above filtered solution were placed in a three-necked stirred reaction flask fitted with Claissen Head and distilled slowly for 3½ hours to a product temperature of 175° C. An aqueous distillate of 7.4 gm. was obtained together with a nonaqueous distillate of 43 cc. (35 gm.) which on analysis was found to contain about 20–25% of white spirit. The residual product was in the form of a blue clear low viscosity liquid and a sample was retained. Dean & Stark drying of the residual (766 gm.) yielded 1.4 cc. of water at a product temperature of 130° C. making a total of 9.1 gm. water per mol of zirconium. The residual product was obtained as a clear blue solution of low viscosity.

A second 1000 gm. of the above filtered solution was transferred to a stirred three-necked reaction flask fitted with Dean & Stark apparatus and dried for 4½ hours to a final product temperature of 171° C. during which time 15.6 cc. of aqueous distillate was obtained. 2.7 cc. of nonaqueous layer was finally flushed off at 170° C. and found to be mainly isobutyl alcohol. The final product was a clear blue low viscosity solution.

The modified products together with the original product were tested for compatibility and drying efficiency in alkyd resin solutions and in refined linseed oils.

Example 20.—$Co_2ZrPrV_3$ 8% cobalt 6% zirconium 220 gm. (⅔ mol) of zirconyl carbonate paste, 32 gm. of isobutyl alcohol and 23 gm. of dipropylene glycol and 120 gm. of white spirit were weighed into a three-necked two litre flask. A mixture of 50 gm. propionic acid and 121 gm. of versatic acid 911 was added with stirring and the mixture heated to 70° C. until the product was almost transparent. An addition was made of 241 gm. of versatic acid followed by 128 gm. of commercial cobalt hydrate and the temperature raised to 101° C. in 2 hours 40 minutes. Water was then removed through Dean & Stark equipment with the product temperature rising to 160° C. in 2 hours. 174 cc. of aqueous distillate was obtained together with 769.5 gm. of a clear blue purple solution. The product was diluted with 213.5 gm. of mineral spirit and filtered giving a clear blue-purple solution with negligible residue.

The solution containing 8% cobalt and 6% zirconium has good compatibility with oils and alkyds and other media and is an effective drier.

Example 21.—$CaZnZrT_4M$ and $CaZnZrT_4Pr$

Zirconium carbonate paste 157 gm. (0.5 mol), isobutyl alcohol 45 gm. and white spirit 75 gm. were weighed into a three-necked two litre flask. A mixture of methacrylic acid 43 gm. and tall oil fatty acid 174 gm. was added with stirring and the mixture reacted to 69° C. for 1½ hours. Tall oil fatty acid 203 gm. was added followed by 41.3 gm. zinc oxide. The product reacted to a transparent solution and was heated to 76° C. in 80 minutes.

Tall oil fatty acid 203 gm. was added followed by 38 gm. of commercial slaked lime ($Ca(OH)_2$) at 66° C. and the product heated to 98° C. in one hour and held under reflux for half an hour. After drying for one hour by Dean & Stark equipment 82 cc. of water was recovered and the product allowed to cool overnight. The product was very viscous at room temperature but easily stirrable on warming up. The product was dried to a flask temperature of 139° C. with recovery of 113 cc. total aqueous distillate. The product was diluted to 60% solids by addition of white spirit 394 gm. to give a solution yield of 1260 gm. The solution was filtered yielding a medium viscosity pale straw coloured liquid.

A repeat of the above preparation was carried out substituting 37 gm. of propionic acid for the methacrylic acid and the product was dried to a flask temperature of 144° C. yielding 115 gm. of water distillate. The solution was diluted to 60% solids by addition of white spirit and filtered to give a pale clear solution of moderate viscosity similar to the tallate methacrylate products.

When the solutions were treated with 0.04% cobalt metal drier and applied to glass panels the films became touch dry in 10–15 minutes and yielded tough glossy films overnight.

Both products were found to be compatible with Paralac 10W alkyd at a 1:1 solids ratio and the resulting mixtures dried to tough films overnight. Both products were compatible with alkali refined linseed oil at a ratio of 100 parts of solution (60 parts solids) to 40 parts of oil. When these 60/40 solutions with 0.04% cobalt on oil and solids were applied to clean burnished mild steel panels air dried for 7 days and exposed on a roof rack at 45° for 7 weeks only slight (1%) corrosion was found. During the same period the parent solutions alone showed heavier general corrosion (30%) with little edge corrosion while the control alkali refined linseed oil containing 1% lead and 0.08% cobalt driers showed 5–10% general corrosion and very heavy edge corrosion.

In combination with linseed oil both solutions gave much better protection to mild steel than the alkali refined linseed oil alone. In these tests no advantage was observed from the use of methacrylic acid as against propionic acid.

Example 22.—$CaPbZrT_4Pr$

By a procedure similar to the products of Example 21 a calcium lead zirconium tallate propionate was made from 164.4 gm. (0.5 mol) of zirconyl carbonate paste, 45 gm. of isobutyl alcohol, 75 gm. white spirit, 37 gm. of propionic acid and a total of 580 gm. of tall oil fatty acid and 111.5 gm. of litharge PbO. The product was dried to a flask temperature of 165° C. yielding 116 cc. of water distillate. The product was reduced to 60% solids by addition of white spirit 421 gm. and filtered. The solution was more viscous than the products of Example 21 and darker brown in colour. When the solution was treated with 0.04% cobalt drier, applied to mild steel and exposed for 7 weeks as in Example 21 the panel showed 2% general corrosion on the upper surface and about 20% on the under surface. The panel showed only slight edge corrosion.

Example 23.—$Pb_2ZrT_4Pr$

Zirconyl carbonate paste 164.4 gm. (0.5 mol), 45 gm. of isobutyl alcohol and 100 gm. of white spirit were weighed out in a three-necked 2 litre flask and an addition made of 37 gm. of propionic acid followed by 580 gm. of tall oil fatty acid. The product was reacted to 75° C. and an addition made of 223.2 gm. of litharge (PbO). The product was reacted for an hour to 92° C. and dried by Dean & Stark procedure to a product temperature of 155° C. with recovery of 90 cc. of water distillate, when an addition was made of white spirit 338 gm. After standing overnight the product was an oily liquid, yield 1384 gm. with a small amount (½–1 gm.) of white sediment. The product filtered easily yielding a clear brown solution.

When treated with 0.04% cobalt on solids and applied to mild steel panels as in Example 21 and examined after 7 weeks' roof exposure 1% general corrosion was found on the upper side and 5% on the underside. The panels showed very slight edge corrosion.

Example 24.—$Pb_2ZrV_3Pr$

Zirconyl carbonate paste 256 gm. (0.75 mol), dipropylene glycol 51 gm. isobutyl alcohol 42 gm. and 75 gm. of 260–290 distillate were weighed into a three-necked 2 litre flask. A mixture of 55.5 gm. propionic acid and 163 gm. of versatic acid 911. The temperature was raised to 70° C. in ½ hour and to 80° C. in 2 hours giving a low viscosity translucent solution. Versatic acid (911) 244 gm. was added, followed by 334.5 gm. of litharge (PbO). After heating to 90° C. in 2 hours a low viscosity opaque solution was obtained. The product was dried by Dean & Stark equipment for 3 hours to a flask temperature of 151° C. when 168 cc. of water distillate was obtained together with a clear pale straw coloured low viscosity solution. The product was diluted to 30% lead content by addition of 260–290 distillate 43 gm. and filtered to give a clear moderately viscous straw coloured solution when cool.

The product can be used as a stabiliser for PVC.

Example 25.—Nickel zirconium versatate propionate $NiZrV_2Pr$

Zirconium carbonate paste 340 gm., 1 mol, isobutyl alcohol 43 gm., dipropylene glycol 68 gm. and white spirit 100 gm. were reacted with propionic acid 74 gm. and versatic acid (911) 181 gm. for 2 hours to 770° C.

An addition was made of versatic acid (911) 181 gm. and basic commercial nickel carbonate 122.5 gm. 1 mol and the product reacted to 97.5° C. under reflux for 2½ hours. It was then dried by Dean & Stark procedure to a flask temperature of 151° C. with recovery of 237 cc. of aqueous distillate.

The product 819 gm. was a clear moderate viscous dark green solution with a small amount (about 0.5 gm.) of sediment. The solution contained 7.1% nickel and 10.5% zirconium.

Example 26.—Copper zirconium naphthenate versatate propionate ½ ICI 810 isoacid

Zirconium carbonate paste 340 gm. (1 mol) dipropylene glycol 68 gm., methyl isobutyl carbinol 102 gm. and white spirit 100 gm. were reacted with propionic acid 74 gm. and versatic acid (911) 181 gm. to a temperature of 67° C. for 1½ hours. An addition of naphthenic acid 240 gm. (1mol) followed by basic copper carbonate 116 gm. (1 mol) was made and reacted for 1 hour at 65° C., temperature raised and the product dried by Dean & Stark procedure, over 4 hours to a maximum temperature of 153° C. 213 cc. of aqueous distillate were recovered. The product was a dark green solution with some lighter green opaque amorphous fraction. An addition was made of ICI 810 isoacid 78 gm. (½ mol) plus 50 cc. of aqueous distillate. The product was refluxed for 2½ hours and then dried by Dean & Stark to a maximum temperature of 146° C. with recovery of 45 cc. aqueous distillate. The product was an oily green liquid yield 1031 gm. containing 6.15% copper and 8.85% zirconium and can be used in preservative and waterproofing formulations.

Example 27.—Iron zirconium versatate propionate ICI 810 isoacid FeZrVPrX X=ICI 810 isoacid Zirconyl carbonate paste 340 gm. (1 mol) dipropylene glycol 68 gm., isobutyl alcohol 43 gm. and white spirit 100 gm. were reacted with propionic acid 74 gm. and ICI 810 acid 156 gm. (1 mol) to a temperature of 75° C. in 1 hour. An addition was made of 181 gm. of versatic acid 911 followed by 56 gm. of Swedish sponge iron powder over a period of 3½ hours. The product was raised to 97° C. under reflux and held for 2 hours. It was dried by Dean & Stark procedure to a product temperature of 152° C. in 4¾ hours giving 202 cc. of aqueous distillate.

The product (785 gm.) was a clear brown mobile solution with a black sediment which was separated, washed with solvent, dried and weighed 15 gm. Iron zirconium products may also be prepared from freshly precipitated water washed iron hydroxide filter cakes.

Example 28.—Magnesium zirconium octoate $MgZrX_3$ X=2 ethyl hexoic acid

Zirconyl carbonate paste 313.5 gm. (1 mol) isobutyl alcohol 56 gm. dipropylene glycol 68 gm. and white spirit 100 gm. were reacted with 2 ethyl hexoic acid 296 gm. (2 mols) to a temperature of 81° C. for 1½ hours. An addition was made of 2 ethyl hexoic acid 148 gm. (1 mol) followed by heavy magnesium carbonate 95 gm. (1 mol) and the product reacted for 1 hour at 65° C. The product was dried by Dean & Stark procedure over 5 hours to a maximum product temperature of 146° C. Aqueous distillate recovered=212 cc. Product yield=801 gm.

The product was a viscous opalescent solution at 20° C. containing 3% magnesium 11.35% zirconium.

Example 29.—Calcium zirconium phosphate acylate $CaZrP_2O_2(OR)_3(OH)_3XV$ where OR=butyl X=ICI 810 acid V=versatic acid 911

Zirconyl carbonate paste 313.5 gm. 1 mol, dipropylene glycol 68 gm. isobutyl alcohol 43 gm. and white spirit 100 gm. were reacted with 156 gm. 1 mol ICI 810 acid followed by 364 gm. of commercial acid butyl phosphoric acid $P_2O_2(OR)_3(OH)_3((RO)_2POOH$ one mol ROPO$(OH)_2$ one mol). Appreciable foaming occurred at 50° C. with about 75% addition of the butyl phosphoric acid. After reacting at 70–80° C. for one hour and standing overnight the product was a pasty stirrable white emulsion. It was partially dried by Dean & Stark procedure with removal of 120 cc. of aqueous distillate and at this point the thick pasty product showed signs of heat sensitivity with some fume.

An addition was made of 181 gm. of versatic acid 911 and the product cooled to 60° C. to give a homogeneous pasty stirrable emulsion. An addition was made of commercial slaked lime ($Ca(OH)_2$ 75 gm. which was dispersed by efficient stirring to give a translucent emulsion of somewhat lower viscosity at 80° C.

The product was dried by Dean & Stark procedure to a product temperature of 127° C. in 2½ hours with a total aqueous distillate of 225 gm. and a product yield of 1048.5 gm. During drying the product remained in the form of a stirrable greasy solid. After standing overnight the product was in the form of a softer greasy translucent solid which increased in structure on stirring at room temperature.

The product is a tacky greasy solid which disperses in white spirit and chloroform at 5—10% concentrations to yield bodied colloidal solutions. A 50% solution in mineral oil Rubrex A110 disperses to a viscous solution at room temperatture and alters little in viscosity on heating to 90° C. and cooling to room temperature.

In the processing of greasy products white spirit in this formulation may be replaced by mineral oil and toluene or other volatile diluent which may be stripped from the final product under vacuum.

The products and related materials may be incorporated in lubricants, greases or adhesives.

Example 30.—Cadmium zirconium propionate dodecyl benzene sulphonate versatate $CdZrPr, SO_3R, V$ Zirconyl carbonate paste 313.5 gm. (1 mol) dipropylene glycol 68 gm. isobutyl alcohol 56 gm. and white spirit 100 gm. were reacted with propionic acid 74 gm. (1 mol) to 50° C. Dodecyl benzene sulphonic acid 326 gm. (1 mol) was added slowly in 4 hours and reacted for 2 hours at 65° C. An addition was made of versatic acid (911) 181 gm., 1 mol followed by cadmium oxide 128 gm. and the product reacted to 98° C. in 2½ hours. The product was dried by Dean & Stark procedure over 4 hours to a maximum product temperature of 150° C. with recovery of 188 cc. of aqueous distillate. Product yield 1040 gm.

The product was a hazy mobile brown oily liquid hot with a silky appearance and cooled to a viscous pourable material containing 10.8% cadmium and 8.75% zirconium. It can be used for PVC stabilisation.

I claim:

1. A process which comprises heating and reacting a compound selected from the group consisting of zirconyl carbonate and zirconium carbonate with a monocarboxylic acid selected from the group consisting of acetic, propionic, 2-ethyl-hexoic, methacrylic, naphthenic and versatic acids, tall oil fatty acids, synthetic branched chain fatty acids having 8 to 10 carbon atoms and mixtures thereof, further reacting the same with one or two substances selected from the group consisting of divalent metals in powder form and oxides, hydroxides and carbonates of divalent metals, said divalent metals being selected from the group consisting of calcium, strontium, barium, zinc, cadmium, magnesium, manganese, iron, nickel, cobalt, lead, mercury, copper and mixtures thereof, and distilling to remove water which is liberated.

2. A process as claimed in claim 1, in which a further quantity up to two moles excess of monocarboxylic acid is added before the second stage of the reaction.

3. A process as claimed in claim 1, in which in addition to the monocarboxylic acid there is added an acid selected from the group consisting of alkyl phosphoric and phosphorous acids having up to four carbon atoms in the alkyl groups, and sulphonic acids having from 8 to 30 carbon atoms.

4. A process as claimed in claim 1, in which there is added to the reaction mixture a substance selected from the group consisting of phenol and alkyl phenols having up to 8 carbon atoms in the alkyl group.

5. A process as claimed in claim 1, in which there is added to the reaction mixture a substance selected from the group consisting of diethylene glycol and dipropylene glycol.

6. A metal-organic compound consisting essentially of a zirconium atom, one or two divalent metal atoms selected from the group consisting of calcium, strontium, barium, zinc, cadmium, magnesium, manganese, iron, nickel, cobalt, lead, mercury, copper and mixtures thereof each linked to said zirconium atom through an oxygen atom, and members occupying the remaining valencies of said zirconium and divalent metal atoms, said members being selected from the group consisting of a monocarboxylic acid selected from the group consisting of acetic, propionic, 2-ethyl-hexoic, methacrylic, naphthenic and versatic acids, tall oil fatty acids, and synthetic branched chain fatty acids having 8 to 10 carbon atoms, phenate and alkyl phenate of up to 8 carbon atoms in the alkyl group, alkyl phosphoric and phosphorous acids of 4 carbon atoms in the alkyl group, dodecyl benzene sulfonic acid, hydroxyl and mixtures thereof.

7. A metal-organic compound as claimed in claim 6 wherein said zirconium and said divalent metal are in the ratio of 2 atomic weights of said divalent metal to 1 atomic weight of said zirconium, and less than 6 equivalents of said monocarboxylic acid are present.

References Cited

UNITED STATES PATENTS

| 3,231,592 | 1/1966 | McCord. |
| 3,183,118 | 5/1965 | Conner. |
| 3,036,101 | 5/1962 | Tittle. |

NICHOLAS S. RIZZO, *Primary Examiner.*

J. A. NARCAVAGE, *Assistant Examiner.*

U.S. Cl. X.R.

260—429.3, 92.8; 106—310, 243